A. E. MOON.
RUBBER COVERED ROLLER.
APPLICATION FILED APR. 3, 1920.

1,370,664.

Patented Mar. 8, 1921.

Inventor
Alfred E. Moon
By Robert M. Pierson
Atty.

ly thereof to prevent elongation of the
UNITED STATES PATENT OFFICE.

ALFRED E. MOON, OF AKRON, OHIO, ASSIGNOR TO THE B. F. GOODRICH COMPANY, OF NEW YORK, N. Y., A CORPORATION OF NEW YORK.

RUBBER-COVERED ROLLER.

1,370,664.  Specification of Letters Patent.  Patented Mar. 8, 1921.

Application filed April 3, 1920. Serial No. 371,120.

*To all whom it may concern:*

Be it known that I, ALFRED E. MOON, a citizen of the United States, residing at Akron, in the county of Summit and State of Ohio, have invented a certain new and useful Rubber-Covered Roller, of which the following is a specification.

This invention relates to the construction of rubber covered rollers such as the inking rollers used in printing presses, and its object is to prevent an elongation of the rubber covering at the ends of the roller during use. In the case of inking rollers this elongation is caused by the heat and pressure to which the roller is subjected in a press and it results in a shortening of the diameter of the roller at its ends so that the latter does not touch the inking drum.

Figure 1:
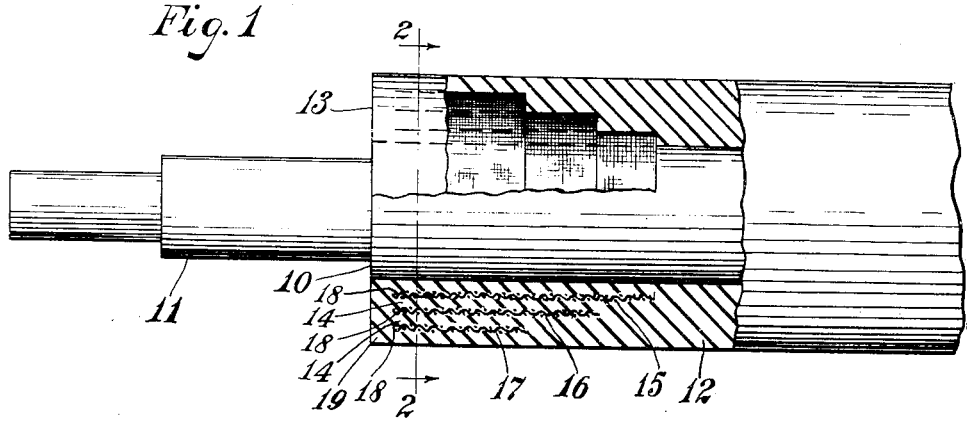
Figure 1 is a view, partly in side elevation and partly in longitudinal section, of one end of an inking roller embodying my invention.
Figure 2:
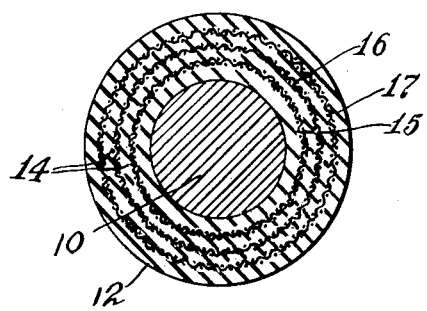
Fig. 2 is a transverse sectional view thereof taken on the line 2—2 of Fig. 1.

In these drawings I have shown a steel or other metal core 10 having a stepped journal 11 and a covering 12 of relatively soft vulcanized rubber. Embedded in the rubber covering adjacent the end 13 thereof are a plurality, here shown as three in number, of circumferential, reinforcing layers of straight-laid woven fabric separated from each other in a radial direction by intervening layers 14 of rubber. The longest fabric layer 15 is nearest the core 10, the next layer 16 is shorter, and is placed approximately half way between the core and the outer surface of the roller, while the third layer 17 is still shorter and is embedded in the rubber slightly below its surface. The outer edges 18 of the layers preferably terminate slightly short of the end surface of the roller so as to leave a thin body of rubber 19 covering and protecting said edges.

The separate layers of fabric resist an outward movement of the adjacent rubber when the roller is subjected to heat and pressure, and the different layers coact to bind a short length of the softer outer portion of the rubber covering to a relatively long length of the inner portion reinforced by the iron core to which it is vulcanized.

The grading of the layers of fabric from the longest near the iron core to the shortest near the surface of the roller provides a sufficient tension receiving or reinforcing means to prevent an axial movement of the rubber at the end of the roller, which movement would be greatest near the outer surface thereof, without adding materially to the stiffness of the ends of the rubber covering. This is especially important in inking rollers where a uniform spreading of the ink depends largely on a uniform resilience in the rubber throughout the length of the roller. The end wall of rubber keeps the oils in the ink and the oils used in cleaning the rollers from attacking the fabric.

I claim:

1. In a roller, the combination of a core, a cylindrical rubber cover thereon, and a fabric reinforcement embedded in the ends only of the cover and extending longitudinally thereof to prevent elongation of the said ends when the roller is in use.

2. In a roller, the combination of a rigid core, a cylindrical outer body of soft vulcanized rubber thereon, and straight-laid woven fabric embedded in the ends only of the said outer body, to prevent elongation of the said ends when the roller is subjected to heat and pressure.

3. In a roller, the combination of a rigid core, a soft-rubber cover vulcanized thereto, and a plurality of spaced, superimposed layers of fabric embedded in the ends only of the rubber covering.

4. In a roller, the combination of a metal core having journals at its ends, a soft-rubber cover on the core between said journals, and radially-spaced, superimposed layers of straight-laid woven fabric of graded lengths embedded in the end of the cover and extending circumferentially about the core, the longest of said layers being adjacent the core and the shortest being adjacent the outer surface of the roller.

5. In a roller, the combination of a rigid core, a cover of soft rubber thereon, and a circumferentially-disposed layer of fabric embedded in the end only of said cover and extending longitudinally thereof, said roller including an end body of rubber covering the outer edge of the fabric.

In witness whereof I have hereunto set my hand this 30th day of March, 1920.

ALFRED E. MOON,